Sept. 17, 1963     A. NEUKOM     3,103,834
APPARATUS FOR REMOVING BURRS FROM THE INSIDE
OF PIPES AND THE LIKE
Filed Feb. 2, 1960
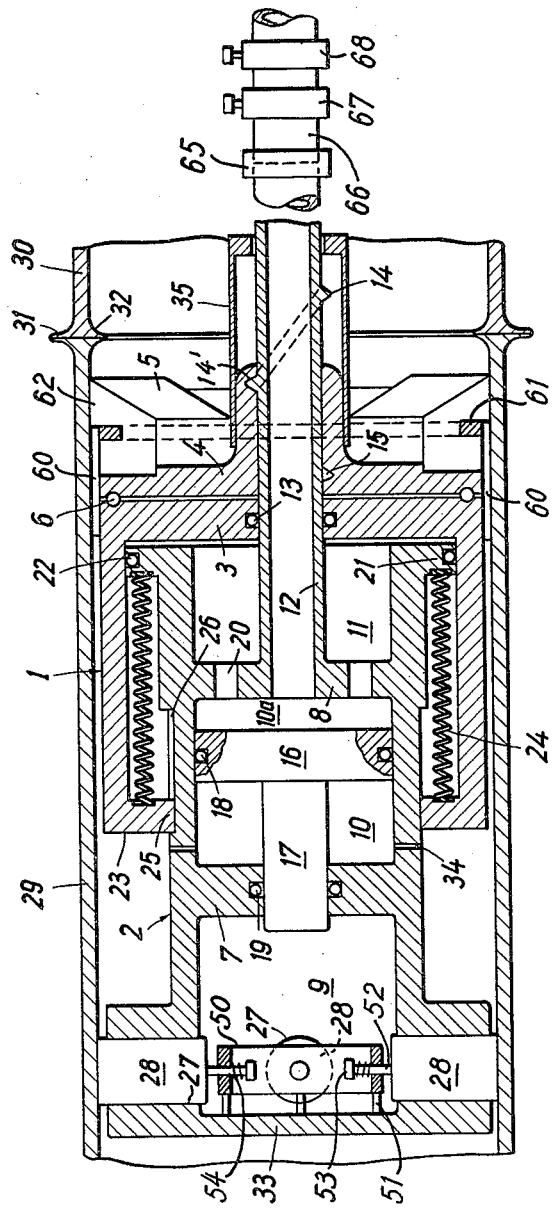
Inventor:
Alfred Neukom
BY Michael S. Striker
Attorney United States Patent Office 3,103,834
Patented Sept. 17, 1963

3,103,834
APPARATUS FOR REMOVING BURRS FROM THE INSIDE OF PIPES AND THE LIKE
Alfred Neukom, Dubendorf, Switzerland, assignor to H. A. Schlatter Aktiengesellschaft, Zollikon, Zurich, Switzerland
Filed Feb. 2, 1960, Ser. No. 6,307
Claims priority, application Switzerland Feb. 2, 1959
9 Claims. (Cl. 77—2)

The present invention relates to a burr-removing apparatus.

Under certain circumstances burrs are located at places where it is extremely difficult to efficiently and quickly remove them. Thus, for example, in the case where a plurality of pipe sections are flash welded to each other in end-to-end relation, the result of the flash welding is that there is an unavoidable annular burr at the joint between a pair of pipe sections in the interior of the pipe resulting from the joining of such a pair of pipe sections together by flash welding in end-to-end relation. It is of course desired to have a pipe which is manufactured in this way provided with a smooth interior surface, and it therefore becomes necessary to remove the burr in the interior of the pipe which results from the welding together of the several pipe sections thereof.

It is an object of the present invention to provide an apparatus according to which it becomes possible to quickly and easily remove a burr under the above conditions or under similar conditions.

Another object of the present invention is to provide an apparatus according to which the burr formed by the welding of each pipe section to a preceding pipe section is quickly and easily removed before the next pipe section is joined so that the burrs are successively removed as the successive pipe sections are joined to the assembly.

An additional object of the present invention is to provide a exceedingly simple and reliable apparatus which can be easily placed in an operating position and which can be easily moved from position to position in order to remove the several burrs during the joining together of the several pipe sections when manufacturing an elongated pipe of the above type.

It is also an object of the present invention to provide a structure which will operate under fluid pressure and which will have various components move automatically in a predetermined sequence.

With the above objects in view the present invention includes in an apparatus for removing a burr from the interior of a pipe or the like a support means which is placed in the interior of the pipe and a releasable fixing means carried by the support means for releasably fixing the latter to the interior of the pipe. A tool-carrying means is carried by the support means for movement with respect thereto so that a tool which is carried by the tool-carrying means will move across a burr or the like in the interior of the pipe to remove this burr when the tool-carrying means advances with respect to the support means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the drawing in which there is shown in a fragmentary axial section a pair of pipe sections which are welded to each other and which have in their interior the structure of the invention which is operated according to the process of the invention, this structure being shown also in an axial section.

Referring now to the drawing, it will be seen that a pair of pipe sections 29 and 30 are illustrated therein joined together in end-to-end relation by a weldment 31. This weldment 31 is produced by flash-welding according to which the pipes 29 and 30 are moved in a known way toward and away from each other so as to generate sufficient heat at the joint to cause the metal of the pipes to become molten and then the pipes are pushed toward each other with a large force causing the plastic metal to become upset so as to form the weldment 31 shown in the drawing. As a result there is provided an annular burr 32 at the joint between the pipe sections 29 and 30, and the present invention deals with a process and apparatus for removing this burr 32.

The structure of the invention includes a tool-carrying means 1 in the form of an outer cylinder which is supported for axial movement by a support means in the form of an inner cylinder 2. The inner cylinder 2 which forms the support means for the tool-carrying means 1 is hollow and has a closed end 33 and an opposed open end. The outer cylinder 1 has an end wall 3 extending across the open end of the inner cylinder 2.

The tool 4 has the cutting edge portions 5 directed toward the burr 32 which is to be removed, and the tool 4 is held next to the end wall of the outer cylinder 1 of the tool-carrying means and a thrust bearing 6 serves to transmit the axial displacement of the tool-carrying means 1 to the tool 4, 5. The tool itself is of a conventional structure and includes the cutting edges 5 which during rotation of the tool 4, 5 around its axis and during advancing of the tool along its axis will cooperate with the burr 32 to remove the latter and provide the interior of the pipe 29, 30 with a smooth continuous surface.

The support means in the form of the hollow cylinder 2 is provided in its interior with a pair of partitions 7 and 8. These partitions define between themselves an intermediate chamber 10, and between the partition 7 and the closed end 33 of the cylinder 2 there is formed the closed chamber 9. Between the partition 8 and the open end of the cylinder 2 there is formed an open chamber 11 of the cylinder 2, so that this cylinder 2 is divided by the partitions 7 and 8 into the three chambers 9–11 which are respectively the closed chamber 9, the intermediate chamber 10, and the open chamber 11, this open chamber 11 communicating with the left surface of the end wall 3 of the outer cylinder 1, as viewed in the drawing.

The various moving parts of the structure of the invention which are described in greater detail below are actuated by a fluid such as air or the like under pressure, and this fluid is supplied through a tube 12 which is fixed to the partition 8 and extends along the common axis of the inner cylinder 2 and the outer cylinder 1. This tube 12 passes through the partition 8 so as to communicate with the interior of the intermediate chamber 10 at the side 10a of a piston 16 which is slidable in the intermediate chamber 10 of the cylinder 2. The end wall 3 of the outer cylinder 1 is formed with an axial opening through which the tube 12 passes in a slidable fluid-tight manner, and a sealing ring 13 is located in a groove of the end wall 3 and engages the exterior surface of the tube 12 so as to maintain the fluid-tight slidable engagement between the wall 3 and the tube 12.

The tool 4, 5 is rotated around its axis during cutting of the burr 32, and this rotation is derived from a thread 14 which is carried by the tube 12 at the exterior surface thereof and an inner thread 15 on the hub of the tool 4, 5 cooperating with the thread 14. The thread 14 terminates at the end 14' indicated in the drawing, so that for this reason the hollow thread 15 appears adjacent the left end of the tool 4, 5 as viewed in the drawing. It will be noted that the thread 14, 15 is of an extremely large pitch, and this pitch is large enough so that the tool 4, 5 will automatically turn around its axis in response to an axial thrust applied thereto by advancing of the tool-carrying means 1 to the right, as viewed in the drawing.

As was pointed out above, a piston 16 is slidable within the intermediate chamber 10 of the inner cylinder 2, and this piston 16 fixedly carries a coaxial plunger 17 which extends through a central opening formed in the partition 7. The plunger 17 extends fluid-tightly and slidably through the opening of the partition 7, and a sealing ring 19 is located in an annular groove of the partition 7 and engages the plunger 17 to maintain this slidable, fluid-tight cooperation between the plunger 17 and the partition 7. Also, a sealing ring 18 is carried by the piston 16 at the exterior periphery thereof in engagement with the inner cylindrical surface of the chamber 10 to provide a fluid-tight slidable engagement between the piston 16 and the cylinder 2 in the chamber 10 of the latter.

The partition 8 is formed with one or more openings 20 of relatively small size which control the flow of the fluid from the space 10a of the chamber 10 through the openings 20 into the chamber 11 in such a way that the fluid under pressure in the chamber 11 will act on the tool-carrying means 1 only after the fluid under pressure has first shifted the piston 16 and the plunger 17 to the left, as viewed in the drawing, so that these openings 20 serve as a delay means for retarding the action of the fluid under pressure on the tool-carrying means 1 and thus the structure will automatically operate to first shift the piston 16 to the left and then to shift the tool-carrying means 1 to the right, as viewed in the drawing.

As is shown in the drawing, the cylinder 2 terminates at its right end in an outwardly directed annular flange 21 which directly engages the interior surface of the outer cylinder 1 in a slidable-fluid-tight manner and for this purpose the outer periphery of the flange 21 is formed with an annular groove which receives a sealing ring 22 which engages the inner surface of the outer cylinder 1 so as to maintain this slidable-fluid-tight engagement between the outer cylinder 1 and the inner cylinder 2. The outer cylinder 1 is formed at its left end, as viewed in the drawing, with an inwardly directed annular flange 23 which engages the exterior surface of the inner cylinder 2 in the manner shown in the drawing. A plurality of coil springs 24 are compressed in the interior of the outer cylinder 1 between the flange 21 and the flange 23 so as to urge the outer cylinder 1 to the left to a rest position which is illustrated in the drawing. The exterior surface of the cylinder 2 is formed with a plurality of axial grooves 26 into which a plurality of projections 25 respectively extend, these projections being in the form of teeth extending inwardly from the flange 23 at the inner periphery of the latter, so that the teeth 25 cooperate with the grooves 26 to limit the movement of the cylinder 1 to the right and left, as viewed in the drawing, and one of these grooves 26 and one of the teeth 25 is shown in the drawing which indicates that teeth 25 are at the left ends of the grooves 26 thus showing the parts where the outer cylinder 1 is in its left-most rest position.

The support means 2 carries a means for releasably fixing the support means to the interior of a pipe 29 or the like, and this releasable fixing means includes a portion of the cylinder 2 at the chamber 9 thereof which is formed with a plurality of radial bores 27 passing through the wall of the cylinder 2. A plurality of radial plungers 28 are respectively slidable in the bores 27, and thus the inner ends of the plungers 28 communicate with the interior of the closed chamber 9. A suitable fluid such as oil is located in the closed chamber 9, the cylinder 2 being provided with a plug which can be removed for introducing oil into the chamber 9 and which can then be replaced so as to maintain the oil in the chamber, this plug not being shown in the drawing. Furthermore, a spring means cooperates with the plungers 28 to urge the latter inwardly to a rest position where their outer ends do not extend beyond the exterior surface of the support means 2. Thus, as may be seen from the drawing, a ring 50 is fixed coaxially with the cylinder in the interior thereof to the wall 33 by a plurality of rods or pins 51, and this ring 50 is formed with a plurality of openings through which respectively extend a plurality of pins 52 which are fixed coaxially to the several radial plungers 28. The pins 52 have within the ring 50 enlarged ends 53, and a plurality of coil springs 54 coiled around the pins 52 between the ring 50 and the enlarged ends 53 of the several pins 52, so that these springs 54 urge the plungers 28 inwardly to their rest position where their outer ends do not extend beyond the cylinder 2. However, when the plunger 17 advances into the cylinder chamber 9 to reduce the volume of the latter, the oil is acted on by the plunger 17 to act on the plungers 28 to move the latter radially away from the axis of the cylinder 2 and to press with their outer end against the inner surface of the pipe 29, so that in this way the structure includes a releasable fixing means for releasably fixing the support means 2 to the interior of the pipe 29. Of course, the exterior ends of the radial plungers 28 can have any curvature conforming to the curvature of the interior of the pipe 29 or the like, and also any suitable keys and key ways or the like may be provided between the pins 52 and the ring 50 for preventing turning of the plungers 28 around their axis, respectively, so that in this way convexly curved outer end faces of the plungers 28 will be properly aligned so as to cooperate properly with the interior surface of a cylindrical pipe 29, for example.

The outer cylinder 1 fixedly carries a plurality of fingers 60 which extend axially beyond the outer cylinder 1 across the left end of the tool 4, 5 without in any way interfering with the rotation of this tool. At their outer free ends the several fingers 60 which are fixed to the cylinder 1 fixedly carry a ring 61 which extends into a plurality of notches 62 formed in the walls of the tool 4, 5 which are fixed to and extend rearward from the cutting edge portions 5 of this tool. Thus, while the location of the ring 61 in the several notches 62 does not in any way interfere with the rotation of the tool 4, 5 or with the transmission of an axial thrust thereto when the cylinder 1 is advanced to the right, as viewed in the drawing, this cooperation of the ring 61 with the notches 62 of the tool 4, 5 guarantees that the tool 4, 5 returns to the position shown in the drawing with the tool-carrying means 1 when the latter is returned to the position as shown in the drawing by expansion of the springs 24 in a manner described below. The tube 12 is long enough to extend completely through the pipe section 30, and at its outer free end the tube 12 is threaded so as to be capable of receiving a coupling 65 at one end of a pipe 66 which communicates with a suitable source of fluid under pressure such as with a compressed air tank. The tube 66 has a pair of valves 67 and 68 which are of a conventional construction. The valve 68 is capable of being moved between open and closed positions while the valve 67 is of the type which can close or open the tube 66 from the outer atmosphere. Thus, when the valve 67 is placed in a position closing the tube 66 from the outer atmosphere the valve 68 can be opened and the air under pressure will enter through the tube 12 into the chamber 10. On the other hand, after the valve 68 is closed it is possible to turn the valve 67 to another position where the interior of the tube 66 to the left of the valve 68, as viewed in the drawing, communicates with the outer atmosphere and thus it is now possible to permit the air under pressure to escape through the tube 12 and the valve 67 to the outer atmosphere when it is desired to release the fluid under pressure.

The above-described structure is operated according to the process of the invention in the following manner:

Assuming that a pipe is being manufactured which is made up of a plurality of pipe sections which are flash welded to each other in end-to-end relation, and assuming that the pipe section 29 is the first of the series of pipe sections which are to be joined together so as to form the pipe, then the support means 2 is placed in the interior of the first pipe section 29 in the position shown in the drawing where the cutting edge portions 5 of the tool 4, 5 are directed toward the right end of the pipe section 29 to which the pipe section 30 is to be joined and is located at a distance from this end of the pipe section 29 which is substantially less than the length of the grooves 26. Of course, at this time the pipe or tube 66 is not joined by the coupling 65 to the tube 12, and therefore the operator can move the second pipe section 30 over the pipe 12 to a position where the pipe sections 29 and 30 are in end-to-end relation, and now the flash welding proceeds in a well-known manner, the pipe sections 29 and 30 being placed in an electrical circuit and moved toward and away from each other so as to generate sufficient heat to render the adjacent ends of the pipes 29 and 30 plastic and then these pipe sections are thrust toward each other along their common axis with an extremely large force and held in this way pressed against each other so as to form the weldment 31 shown in the drawing, this weldment including, of course, the inner burr 32 which must be removed.

After the tube 30 was placed over the tube 12, the pipe 66 was connected to the tube 12 by the couplings 65 in a fluid-tight manner so that this connection of the tubes 12 and 66 is already completed before the welding of the pipe sections 29 and 30 to each other has been completed. Immediately after the welding is completed, while the burr 32 is still glowing and while the upsetting pressure at the end of the welding process is still applied to the tubes 29 and 30 urging them toward each other along their common axis, the valve 67 is actuated to close off the pipe 66 from the outer atmosphere and the valve 68 is opened so that the fluid under pressure will now enter into the space 10a and will advance the piston 16 to the left causing the plunger 17 to enter into the closed chamber 9 into the oil of the latter so as to cause the plungers 28 to move outwardly against the inner surface of the pipe section 29 and in this way releasably fix the support means 2 to the interior of the pipe section 29. It will be noted that on the one hand the diameter of the plunger 17 is substantially less than that of the piston 16 so that all of the pressure applied over the relatively large area of the piston 16 is concentrated on the relatively small cross-sectional area of the plunger 17, and furthermore the air pressure in the chamber 10 is transmitted through the piston 16 and through the plunger 17 according to the square of the diameters of the piston 16 and plunger 17, so that a considerably increased pressure is applied to the plungers 28 to urge the latter forcefully against the inner surface of the pipe section 29 and reliably hold the support means 2 in the desired position. Thus, with this arrangement in which piston 16 and plunger 17 form differential piston means a considerable mechanical advantage is obtained since the increase in the pressure as between the air pressure in the space 10a and the oil pressure in the chamber 9 is according to the square of the ratio between the diameters of the piston 16 and the plunger 17.

As was pointed out above, the openings 20 delay the flow of the fluid under pressure into the open chamber 11 by throttling this flow, so that it is the plunger 16 which first advances to the left, as viewed in the drawing so as to cause the releasable fixing means to be actuated first for fixing the support means 2 in the position shown in the drawing. Thereafter the outer cylinder 1 is advanced to the right under the force of the fluid under pressure in the open chamber 11, compressing the springs 24, and advancing the tool 4, 5 to the right also through the thrust bearing 6, the threads 14, 15 cooperating to turn the tool 4, 5 and thus cause the burr 32 to be removed while it is still glowing and while the upsetting pressure is still applied to the pipe sections 29 and 30.

The hub of the tool 4, 5 carries a tubular cover 35 in which the thread 14 is always located so that it is impossible for any foreign body such as falling chips of the removed burr 32 to engage the thread 14 and disturb the operation thereof.

The advancing of the tool-carrying means 1 to the right, as viewed in the drawing, continues until the inner teeth 25 of the flange 23 engage the right ends of the grooves 26, and since the cutting edge portion 5 of the tool 4, 5 is at a distance from the burr 32 less than the length of the grooves 26, the stroke of the tool-carrying means 1 is more than sufficient to advance the cutting tool completely across the burr which is thus removed in this manner.

When sufficient time has elapsed for the tool 4, 5 to have been advanced across the burr 32 so as to remove the latter, the valve 68 is closed and the valve 67 is opened so that the pressure is released and the springs 24 return the tool-carrying means 1 and the tool 4, 5 to the position thereof with respect to the support means 2 which is shown in the drawing, and also the springs 54 return the plungers 28 to their inner positions where they do not extend beyond the exterior surface of the cylinder 2 so that in this way the oil in the closed chamber 9 is displaced for advancing the plunger 17 to the right, as viewed in the drawing so as to return the piston 16 to the position thereof shown in the drawing, the opening of the valve 67 to the outer atmosphere relieving any resistance of movement of the piston 16 to the right, as viewed in the drawing.

After the valve 67 has been opened for a length of time sufficient to allow the air under pressure to escape from the interior of the apparatus of the invention, the coupling 65 is disconnected and the operator grasps the tube 12 at its right end, as viewed in the drawing, and now pulls the entire apparatus of the invention along the interior of the tube or pipe 30 to the right end thereof which is not shown in the drawing, until the apparatus has with respect to the free end of the pipe section 30 the same relation that it has with respect to the right end of the pipe section 29, as shown in the drawing, and thus the apparatus is now again positioned properly for the welding of the next pipe section to the pair of pipe sections 29 and 30 at the free end of the latter, and all of the above operations are repeated.

If desired, the pipe 12 can be provided at its right free end with eyes or the like to which chains are connected which will facilitate in the pulling of the tube 12 and all of the structure of the invention to the right after the removing of each burr as the several pipe sections are successively welded together in end-to-end relation.

It will be noted from the drawing that the intermediate chamber 10 of the cylinder 2 communicates through bores 34 formed in the wall of the cylinder 2 with the interior of the pipe section 29 and thus with the outer atmosphere so that between the partition 7 and the piston 16 there is never any pressure above atmospheric pressure resisting movement of the piston 16 to the left, as viewed in the drawing, and of course there is also no pressure less than atmospheric pressure resisting movement of the piston 16 to the right, as viewed in the drawing, as a result of these bores 34 which are formed in the wall of the cylinder 2 between the partition 7 and the piston 16.

Of course, when each of the successive tube or pipe sections is placed around the tube 12, the latter tube is again connected through the coupling 65 to the tube 66.

If desired an automatic structure may be actuated from the welding structure itself for the purpose of automatically actuating the valves 67 and 68 in the proper sequence.

Also, if desired, the fluid-pressure for the chamber 11 may be obtained by placing an explosive in this chamber and igniting this explosive at the desired time.

Moreover, the tool which removes the burr need not necessarily be of the type which turns and can simply move axially across the burr in the nature of a cutting tool of a shaper or a planer, and in this case the threads 14 and 15 would be omitted as well as the hub structure 4 and thrust bearing 6. Such a cutting tool would simply be fixed directly to the tool-carrying means 1 at the wall 3 thereof.

It will be understood that each of the elements described above, or two or more together, may also find a useful application in other types of process and apparatus for moving burrs differing from the types described above.

While the invention has been illustrated and described as embodied in process and apparatus for removing burrs from the interior of pipes or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In an apparatus for removing a burr from the interior of a pipe or the like, in combination, support means adapted to be placed in the interior of a pipe or the like; releasable fixing means carried by said support means for releasably fixing the same to a pipe or the like in the interior of the latter, said releasable fixing means including a plurality of pistons mounted in said support means for movement between a retracted and an advanced position in which said pistons are adapted to engage the inner surface of the pipe; tool carrying means for carrying a tool which will act on a burr in the interior of a pipe or the like to remove the burr, said tool-carrying means being carried by said support means for movement with respect to the latter in a direction which will place a tool carried by said tool-carrying means in engagement with a burr to remove the latter; and fluid-pressure means cooperating with said support means and said pistons of said releasable fixing means for directly applying fluid pressure to the latter to move said pistons to said advanced position thereof so as to fix the support means releasably to the interior of a pipe or the like.

2. In an apparatus for removing a burr from the interior of a pipe or the like, in combination, support means adapted to be placed in the interior of a pipe or the like; releasable fixing means carried by said support means for releasably fixing the same to a pipe or the like in the interior of the latter, said releasable fixing means including a plurality of pistons mounted in said support means for movement between a retracted and an advanced position in which said pistons are adapted to engage the inner surface of the pipe; tool carrying means for carrying a tool which will act on a burr in the interior of a pipe or the like to remove the burr, said tool-carrying means benig carried by said support means for movement with respect to the latter in a direction which will place a tool carried by said tool-carrying means in engagement with a burr to remove the latter; and fluid-pressure means cooperating with said support means and said pistons of said releasable fixing means for directly applying fluid pressure to the latter to move said pistons to said advanced position thereof so as to fix the support means releasably to the interior of a pipe or the like, said fluid pressure means also cooperating with said tool-carrying means for advancing the latter with respect to said support means.

3. In an apparatus for removing a burr from the interior of a pipe or the like, in combination, support means adapted to be placed in the interior of a pipe or the like; releasable fixing means carried by said support means for releasably fixing the same to a pipe or the like in the interior of the latter; tool-carrying means for carrying a tool which will act on a burr in the interior of a pipe or the like to remove the burr, said tool-carrying means being carried by said support means for movement with respect to the latter in a direction which will place a tool carried by said tool-carrying means in engagement with a burr to remove the latter; and fluid-pressure means cooperating with said support means, said releasable fixing means, and said tool-carrying means for first actuating said releasable fixing means to fix said support means to a pipe or the like in the interior thereof and for automatically actuating said tool-carrying means to advance the latter with respect to said support means only after said releasable fixing means have fixed said support means to the pipe.

4. In an apparatus for removing a burr from the interior of a pipe or the like, in combination, support means adapted to be placed in the interior of a pipe or the like; releasable fixing means carried by said support means for releasably fixing the same to a pipe or the like in the interior of the latter; tool-carrying means for carrying a tool which will act on a burr in the interior of a pipe or the like to remove the burr, said tool-carrying means being carried by said support means for movement with respect to the latter in a direction which will place a tool carried by said tool-carrying means in engagement with a burr to remove the latter; differential piston means located in the interior of said support means and having a large diameter piston and a small diameter piston; fluid-pressure means communicating with the interior of said support means for applying fluid pressure to said large diameter piston, and said differential piston means cooperating with said releasable fixing means for transmitting the force of the fluid pressure through said small diameter piston to said releasable fixing means to releasably fix the support means to the pipe or the like in the interior thereof with a force greater than the unit force of said fluid-pressure means.

5. In an apparatus for removing a burr from the interior of a pipe or the like, in combination, support means adapted to be placed in the interior of a pipe or the like; releasable fixing means carried by said support means for releasably fixing the same to a pipe or the like in the interior of the latter; tool-carrying means for carrying a tool which will act on a burr in the interior of a pipe or the like to remove the burr, said tool-carrying means being carried by said support means for movement with respect to the latter in a direction which will place a tool carried by said tool-carrying means in engagement with a burr to remove the latter; and fluid-pressure means cooperating with said support means and with said releasable fixing means as well as said tool-carrying means for actuating said releasable fixing means and said tool-carrying means, said fluid pressure means including time delay means for first actuating said releasably fixing means and for actuating said tool-carrying means only after said releasably fixing means have fixed said support means to the pipe.

6. In an apparatus for removing a burr or the like from the interior of a pipe or the like, in combination, an elongated inner hollow cylinder having a closed end and an opposite open end, said cylinder carrying a pair of partitions in its interior dividing said cylinder into three chambers one of which is open at said open end of said cylinder, the other of which is closed at said closed end of said cylinder, and the third of which is intermediate between said closed and open chambers, the partition between said closed and intermediate chambers being formed with an opening passing therethrough and the partition between said intermediate and open chambers also being formed with at least one opening passing therethrough providing communication between said intermediate and open chambers of said cylinder; a piston slidable in said intermediate chamber; an axial plunger fixed to said piston and extending slidably and fluid-tightly through said opening of said partition between said intermediate and closed chambers of said cylinder so that said axial plunger will extend into the interior of said closed chamber at least when said piston is close to said partition between said intermediate and closed chambers of said cylinder, said cylinder being formed at the closed chamber end thereof with a plurality of radial openings distributed about the axis of said cylinder; a plurality of radial plungers respectively slidable fluid-tightly in said radial openings, so that when said piston is advanced toward said closed chamber said axial plunger will move into the latter to reduce the interior volume thereof and thus urge said radial plungers outwardly to press against the inner surface of a pipe or the like in which said inner cylinder is located so as to releasably fix said inner cylinder to the interior of a pipe or the like; an elongated fluid-supply tube fixed to the partition between said intermediate and open chambers of said cylinder and passing through the latter partition so that said tube will supply fluid under pressure to the interior of said intermediate chamber at the side of said piston therein which is directed toward said open chamber of said cylinder, the fluid under pressure urging the piston toward said closed chamber of said cylinder and also passing through said opening of said partition between said intermediate and open chambers into the latter chamber; an outer cylinder slidable on said inner cylinder at the region of said open chamber thereof, said outer cylinder having an end wall which extends across said inner cylinder at the open end of the latter, whereby the fluid under pressure which passes into said open chamber will engage said end wall of said outer cylinder to advance the latter axially along said inner cylinder in a direction which increases the space between said end wall of said outer cylinder and said open chamber of said inner cylinder; and a tool carried by said outer cylinder for removing a burr during axial movement of said outer cylinder with respect to said inner cylinder.

7. In an apparatus for removing a burr or the like from the interior of a pipe or the like, in combination, an elongated inner hollow cylinder having a closed end and an opposite open end, said cylinder carrying a pair of partitions in its interior dividing said cylinder into three chambers one of which is open at said open end of said cylinder, the other of which is closed at said closed end of said cylinder, and the third of which is intermediate between said closed and open chambers, the partition between said closed and intermediate chambers being formed with an opening passing therethrough and the partition between said intermediate and open chambers also being formed with at least one opening passing therethrough providing communication between said intermediate and open chambers of said cylinder; a piston slidable in said intermediae chamber; and axial plunger fixed to said piston and extending slidably and fluid-tightly through said opening of said partition between said intermediate and closed chambers of said cylinder so that said axial plunger will extend into the interior of said closed chamber at least when said piston is close to said partition between said intermediate and closed chambers of said cylinder, said cylinder being formed at the closed chamber end thereof with a plurality of radial openings distributed about the axis of said cylinder; a plurality of radial plungers respectively slidable fluid-tightly in said radial openings, so that when said piston is advanced toward said closed chamber said axial plunger will move into the latter to reduce the interior volume thereof and thus urge said radial plungers outwardly to press against the inner surface of a pipe or the like in which said inner cylinder is located so as to releasably fix said inner cylinder to the interior of a pipe or the like; an elongated fluid-supply tube fixed to the partition between said intermediate and open chambers of said cylinder and passing through the latter partition so that said tube will supply fluid under pressure to the interior of said intermediate chamber at the side of said piston therein which is directed toward said open chamber of said cylinder, the fluid under pressure urging the piston toward said closed chamber of said cylinder and also passing through said opening of said partition between said intermediate and open chambers into the latter chamber; an outer cylinder slidable on said inner cylinder at the region of said open chamber thereof, said outer cylinder having an end wall which extends across said inner cylinder at the open end of the latter, whereby the fluid under pressure which passes into said open chamber will engage said end wall of said outer cylinder to advance the latter axially along said inner cylinder in a direction which increases the space between said end wall of said outer cylinder and said open chamber of said inner cylinder; and a tool carried by said outer cylinder for removing a burr during axial movement of said outer cylinder with respect to said inner cylinder, said end wall of said outer cylinder being formed with an opening through which said tube passes slidably and fluid-tightly.

8. In an apparatus for removing a burr or the like from the interior of a pipe or the like, in combination, an elongated inner hollow cylinder having a closed end and an opposite open end, said cylinder carrying a pair of partitions in its interior dividing said cylinder into three chambers one of which is open at said open end of said cylinder, the other of which is closed at said closed end of said cylinder, and the third of which is intermediate between said closed and open chambers, the partition between said closed and intermediate chambers being formed with an opening passing therethrough and the partition between said intermediate and open chambers also being formed with at least one opening passing therethrough providing communication between said intermediate and open chambers of said cylinder; a piston slidable in said intermediate chamber; an axial plunger fixed to said piston and extending slidably and fluid-tightly through said opening of said partition between said intermediate and closed chambers of said cylinder so that said axial plunger will extend into the interior of said closed chamber at least when said piston is closed to said partition between said intermediate and closed chambers of said cylinder, said cylinder being formed at the closed chamber end thereof with a plurality of radial openings distributed about the axis of said cylinder; a plurality of radial plungers respectively slidable fluidtightly in said radial openings, so that when said piston is advanced toward said closed chamber said axial plunger will move into the latter to reduce the interior volume thereof and thus urge said radial plungers outwardly to press against the inner surface of a pipe or the like in which said inner cylinder is located so as to releasably fix said inner cylinder to the interior of a pipe or the like; an elongated fluid-supply tube fixed to the partition between said intermediate and open chambers of said cylinder and passing through the latter partition so that said tube will supply fluid under pressure to the interior of said intermediate chamber at the side of said piston therein which is directed toward said open chamber of said cylinder, the fluid under pressure urging the piston toward said closed chamber of said cylinder and also passing through said opening of said partition between said intermediate and open chambers into the latter chamber; an outer cylinder slidable on said inner cylinder at the region of said open chamber thereof, said outer cylinder having an end wall which extends across said inner cylinder at the open end of the latter, whereby the fluid under pressure which passes into said open chamber will engage said end wall of said outer cylinder to advance the latter axially along said inner cylinder in a direction which increases the space between said end wall of said outer cylinder and said open chamber of said inner cylinder; a tool carried by said outer cylinder for removing a burr during axial movement of said outer cylinder with respect to said inner cylinder, said end wall of said outer cylinder being formed with an opening through which said tube passes slidably and fluid-tightly; the tool which is carried by said outer cylinder at said end wall thereof also being formed with an opening through which said tube passes, said tube having an external thread and the tool having an internal thread cooperating with said external thread so that during advancing of said outer cylinder and said tool along said tube the tool will rotate.

9. In an apparatus for removing a burr or the like from the interior of a pipe or the like, in combination, an elongated inner hollow cylinder having a closed end and an opposite open end, said cylinder carrying a pair of partitions in its interior dividing said cylinder into three chambers one of which is open at said open end of said cylinder, the other of which is closed at said closed end of said cylinder, and the third of which is intermediate between said closed and open chambers, the partition between said closed and intermediate chambers being formed with an opening passing therethrough and the partition between said intermediate and open chambers also being formed with at least one opening passing therethrough providing communication between said intermediate and open chambers of said cylinder; a piston slidable in said intermediate chamber; an axial plunger fixed to said piston and extending slidably and fluid-tightly through said opening of said partition between said intermediate and closed chambers of said cylinder so that said axial plunger will extend into the interior of said closed chamber at least when said piston is close to said partition between said intermediate and closed chambers of said cylinder, said cylinder being formed at the closed chamber end thereof with a plurality of radial openings distributed about the axis of said cylinder; a plurality of radial plungers respectively slidable fluid-tightly in said radial openings, so that when said piston is advanced toward said closed chamber said axial plunger will move into the latter to reduce the interior volume thereof and thus urge said radial plungers outwardly to press against the inner surface of a pipe or the like in which said inner cylinder is located so as to releasably fix said inner cylinder to the interior of a pipe or the like; an elongated fluid-supply tube fixed to the partition between said intermediate and open chambers of said cylinder and passing through the latter partition so that said tube will supply fluid under pressure to the interior of said intermediate chamber at the side of said piston therein which is directed toward said open chamber of said cylinder, the fluid under pressure urging the piston toward said closed chamber of said cylinder and also passing through said opening of said partition between said intermediate and open chambers into the latter chamber; an outer cylinder slidable on said inner cylinder at the region of said open chamber thereof, said outer cylinder having an end wall which extends across said inner cylinder at the open end of the latter, whereby the fluid under pressure which passes into said open chamber will engage said end wall of said outer cylinder to advance the latter axially along said inner cylinder in a direction which increases the space between said end wall of said outer cylinder and said open chamber of said inner cylinder; a tool carried by said outer cylinder for removing a burr during axial movement of said outer cylinder with respect to said inner cylinder, said end wall of said outer cylinder being formed with an opening through which said tube passes slidably and fluid-tightly; the tool which is carried by said outer cylinder at said end wall thereof also being formed with an opening through which said tube passes, said tube having an external thread and the tool having an internal thread cooperating with said external thread so that during advancing of said outer cylinder and said tool along said tube the tool will rotate; and cover means carried by the tool for covering the thread on said tube so that the thread will not be engaged by foreign bodies such as chips from the burr or the like.

References Cited in the file of this patent

UNITED STATES PATENTS

| | | |
|---|---|---|
| 2,115,911 | Gartin | May 3, 1938 |
| 2,403,229 | Murray et al. | July 2, 1946 |
| 2,654,292 | Pearson | Oct. 6, 1953 |
| 2,682,181 | Toth | June 29, 1954 |
| 2,794,244 | Uecker | June 4, 1957 |
| 2,852,964 | Erickson | Sept. 23, 1958 |
| 2,923,208 | Hotchkiss | Feb. 2, 1960 |

FOREIGN PATENTS

| | | |
|---|---|---|
| 22,812 | Sweden | July 27, 1907 |
| 488,844 | Germany | Jan. 13, 1930 |